(12) United States Patent
Gierow et al.

(10) Patent No.: US 7,235,280 B2
(45) Date of Patent: Jun. 26, 2007

(54) NON-INTRUSIVE PHOTOGRAMMETRIC TARGETS

(75) Inventors: Paul Gierow, Madison, AL (US); Greg Laue, Huntsville, AL (US); William Clayton, Huntsville, AL (US); David Murphy, Huntsville, AL (US)

(73) Assignee: SRS Technologies, Inc., Huntsville, AL (US)

( * ) Notice: Subject to any disclaimer, the term of this patent is extended or adjusted under 35 U.S.C. 154(b) by 397 days.

(21) Appl. No.: 10/712,555

(22) Filed: Nov. 12, 2003

(65) Prior Publication Data

US 2005/0100676 A1    May 12, 2005

(51) Int. Cl.
*B00D 5/06* (2006.01)
(52) U.S. Cl. .............. 427/162; 427/163.1; 427/180; 427/214; 427/207.1; 427/163.4
(58) Field of Classification Search ............ 427/162, 427/163.1, 180, 214, 207.1, 163.4
See application file for complete search history.

(56) References Cited

U.S. PATENT DOCUMENTS

| | | | |
|---|---|---|---|
| 3,783,294 A | 1/1974 | Koper | |
| 4,286,871 A | 9/1981 | Erickson | |
| 4,423,931 A | 1/1984 | Shapiro | |
| 4,434,010 A * | 2/1984 | Ash | 106/415 |
| 4,580,167 A | 4/1986 | Diete | |
| 4,824,248 A | 4/1989 | Neumann | |
| 5,073,005 A | 12/1991 | Hubbs | |
| 5,166,725 A | 11/1992 | Ramsay | |
| 5,202,168 A | 4/1993 | Turner et al. | |
| 5,216,476 A | 6/1993 | Lanckton | |
| 6,285,959 B1 | 9/2001 | Greer | |
| 6,415,734 B1 | 7/2002 | LaPuzza | |
| 6,421,049 B1 | 7/2002 | Reinhardt et al. | |
| 6,587,600 B1 | 7/2003 | Shipley | |
| 2001/0046323 A1 | 11/2001 | Cork et al. | |
| 2002/0036617 A1 | 3/2002 | Pryor | |
| 2002/0191292 A1* | 12/2002 | Mimura | 359/530 |
| 2003/0090800 A1* | 5/2003 | Humpal et al. | 359/551 |
| 2003/0096904 A1* | 5/2003 | Hakuta et al. | 524/588 |
| 2004/0127614 A1* | 7/2004 | Jiang et al. | 524/270 |

FOREIGN PATENT DOCUMENTS

| | | |
|---|---|---|
| EP | 0 321 836 A2 | 1/1988 |
| EP | 0 358 818 B1 | 1/1990 |
| EP | 0 358 818 A1 | 12/1990 |
| EP | 0 599 024 B1 | 1/1994 |
| WO | WO 01/14830 A1 | 3/2001 |
| WO | WO 01/66414 A1 | 9/2001 |

* cited by examiner

*Primary Examiner*—Alain L. Bashore
(74) *Attorney, Agent, or Firm*—David E. Mixon; Bradley, Arant, Rose & White LLP

(57) ABSTRACT

A target for use in photogrammetric analysis that does not distort the object to be analyzed has been developed. The target is formed by mixing a diffuse material with a solvent and then applying the mixture to the surface of the object to be analyzed. The object is then coated with a reflective material so that the diffuse material forms a reflective target suitable for use in photogrammetric analysis.

22 Claims, 6 Drawing Sheets

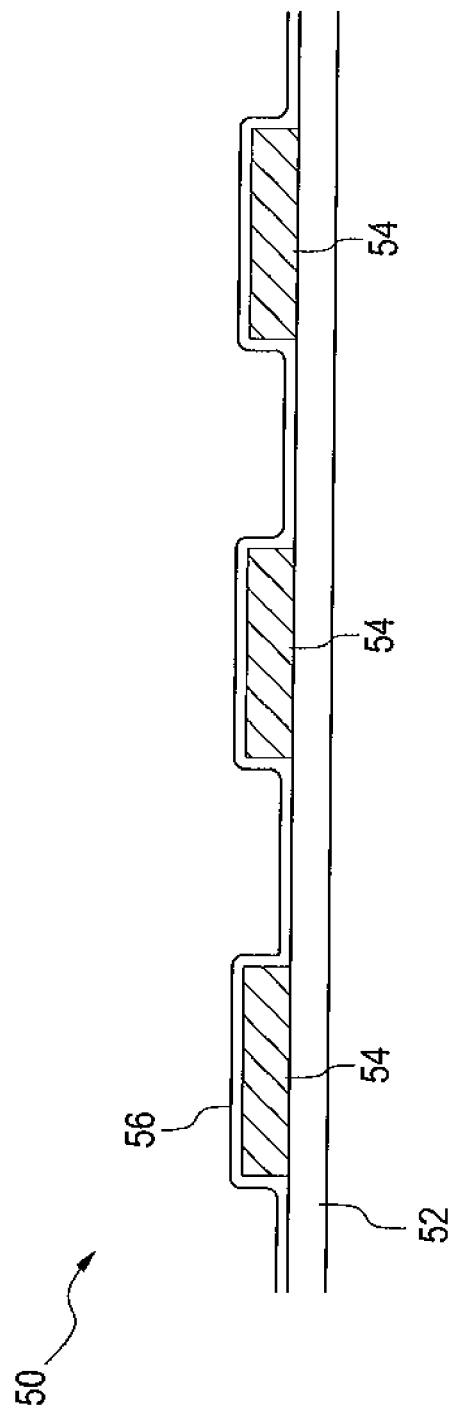

NON-INTRUSIVE PHOTOGRAMMETRIC TARGETS

BACKGROUND OF THE INVENTION

1. Field of the Invention

The invention relates generally to photogrammetric analysis. More specifically, the invention relates to targets for non-intrusive photogrammetric analysis of surfaces and structures.

2. Background Art

Photogrammetry is a three dimensional coordinate measuring technique that uses photographs as the fundamental medium for measurement. Over recent years, the technique has emerged as a popular measurement tool for high precision measurement. It has a wide variety of applications in industries such as aerospace, automotive, shipbuilding, nuclear, communications, etc. Triangulation is the fundamental principle used by photogrammetry. "Lines of Sight" are developed by taking photographs of the object of interest from at least two different locations. The lines of sight are mathematically intersected to produce the three dimensional coordinates of the object. The coordinates are then analyzed for such things as defects in the shape of the object.

FIG. 1 shows an example of a prior art photogrammetric system that is analyzing a parabolic dish antenna. The principle of the photography portion 10 of the system is relatively straightforward. A light source 12 illuminates the object 14. The source typically uses a high intensity light that is generated in the form of a flash or a strobe light. In this example, the object 14 is a parabolic shaped dish antenna. The object 14 is covered with reflective targets. FIG. 2 shows a prior art example of a section 20 of the object 14 that is covered with reflective targets 24. The reflective targets 24 are adhesive dots that have a high contrast to the surface 22 of the object. As light from the light source 12 is reflected back from the targets 24 on the object 14, two cameras 16 record the reflection and the coordinates of the target are calculated by a computer (not shown).

Once the coordinates of the targets are determined, three dimensional depictions of the targets and the surface of the object are generated. FIGS. 3A-3C shown examples of computer generated three dimensional depictions of the shape of the object. FIG. 3A shows a depiction 30 of the coordinates of several rows of targets radiating outwards from the center of the object. Eventually, as shown in FIG. 3B, enough coordinates are recorded to generate a complete three dimensional depiction 32 of the object. Once this is complete, defects in the shape of the object 34 can be identified and highlighted by the computer. Ultimately, entire areas of deformation 42 of the object are identified and depicted 40 by the computer as shown in FIG. 3C.

For an antenna, photogrammetric analysis can be used to measure such features and characteristics as: the antenna surface deformation; the feed alignment; the shape analysis; and damage after shipping. However for thin film applications that are designed for use in space such as solar sails or inflatable antennas, photogrammetric analysis is not often accurate. These objects are made of very thin films of material that tend to deform when target reflectors are placed on their surface. The presence of these reflectors with their mass tends to distort their shape and thus lead to inaccurate measurements of the surface of such objects. This distortion due to the mass of the reflectors can influence the object both statically and dynamically. The current reflective targets can also interfere with the packaging and deployment of film structures. The mass of the current targets interfere with the mass and stiffness characteristics of the parent material affecting the measurement results of the structure. Consequently, a non-intrusive reflector is needed in order to properly analyze thin film objects with photogrammetry.

SUMMARY OF INVENTION

In some aspects, the invention relates to a method for applying a target reflector to an object for photogrammetric analysis, comprising: mixing a diffuse material with a solvent; applying the diffuse material and the solvent to the surface of the object so that the diffuse material bonds with the surface of the object; and applying a reflective coating to the surface of the object, where the diffuse material forms a target reflector.

In other aspects, the invention relates to a method for applying a target reflector to an object for photogrammetric analysis, comprising: step for applying a diffuse material to the surface of the object; and step for applying a reflective material over the surface of the object.

In other aspects, the invention relates to a method for applying a target reflector to an object for photogrammetric analysis, comprising: casting a diffuse material in a film; punching segments of the diffuse material from the film and onto to the surface of the object, where the segments of diffuse material are held in place with adhesive; and applying a layer of reflective metallized coating to the surface of the object, where the segments of diffuse material form target reflectors on the surface of the object.

In other aspects, the invention relates to a method for applying a target reflector to an object for photogrammetric analysis, comprising: applying a liquid solution of membrane material to a substrate, where the substrate has at least one diffuse areas on its surface; curing the liquid solution of membrane material to form a membrane, where the diffuse area of the substrate form a diffuse area in the membrane; removing the membrane from the substrate; and applying a reflective coating to the surface of the object, where the diffuse area of the membrane forms a target reflector.

In other aspects, the invention relates to a method for applying a target reflector to an object for photogrammetric analysis, comprising: step for forming a diffuse area on a membrane that casts the object; and step for applying a reflective material over the membrane so that a target reflector is formed on the object.

Other aspects and advantages of the invention will be apparent from the following description and the appended claims.

BRIEF DESCRIPTION OF DRAWINGS

It should be noted that identical features in different drawings are shown with the same reference numeral.

FIG. 4 shows a cross-sectional view of non-intrusive reflectors in accordance with one embodiment of the present invention.

DETAILED DESCRIPTION

A non-intrusive photogrammetric target reflector has been developed that is embedded in a thin film material. The target reflector adds minimally to the mass of the object so as not to distort or deform the shape of a thin film object that is being photogrammetrically analyzed.

The target is created by applying a diffuse reflective material directly to the surface of the thin object. In typical reflective materials, such as an Aluminum film, light is reflected off of the material at an angle equal to the incidence angle. In order to view the reflection of the light, an observer must be positioned at the incidence angle from the source. If the observer is outside the incidence angle in either direction, the reflected light will either not be visible or be greatly reduced in its intensity. In contrast, a diffuse material will reflect light from a light source across an array of angles. This allows an observer to view the reflected light at multiple angles from the source. Examples of diffuse reflective materials include the reflective materials on safety vests, traffic signs, etc. Diffuse reflective materials may be small "nanofibers" of material, glass micro-beads, or any other material with a high index of refraction.

In one example of the present invention, the object is an inflatable antenna designed for orbital use. The antenna comprises a membrane of a light weight, thin polymer that is rendered reflective by coating it with metallized evaporative coating. The antenna typically has a thickness of 1.0-25.0 microns. The nanofibers that comprise the target are small fibrous threads made of the same or similar polymeric material as the membrane. The nanofibers are mixed with a solvent and deposited on the surface of the membrane before the application of the reflective metallic evaporative coating. The solvent causes localized melting and bonding of the fibers to the membrane. This results in a homogenous membrane that has a diffuse surface where the nanofibers were applied. The metallized coating is then applied to the surface of the membrane covering both the diffuse and non-diffuse areas of the membrane.

Figure 1:
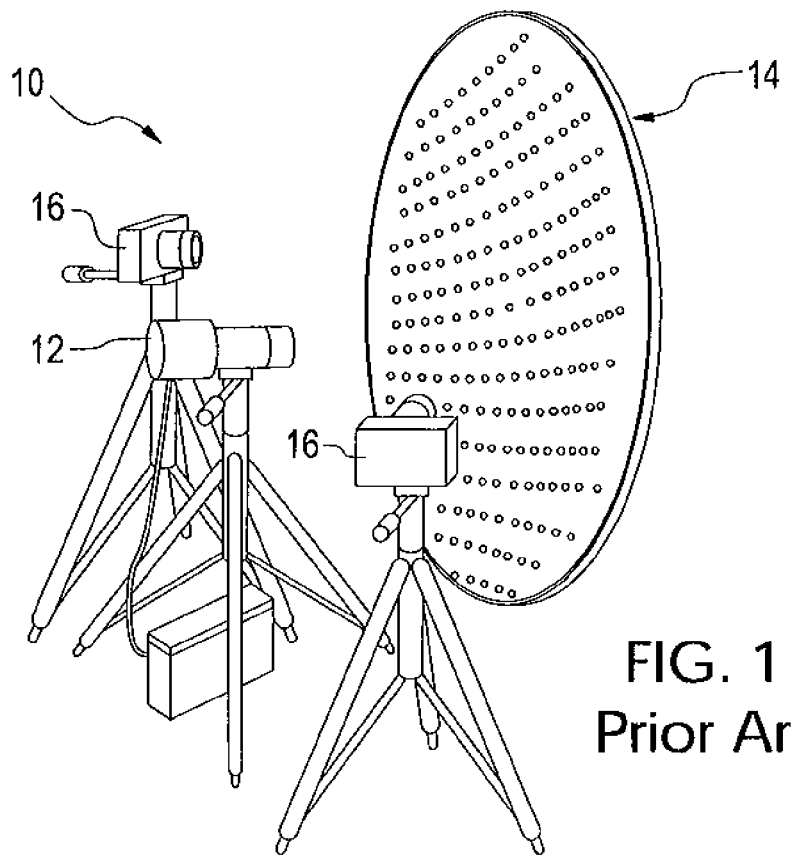
FIG. 1 shows an example of a prior art photogrammetric system that is analyzing a parabolic dish antenna.
Figure 2:
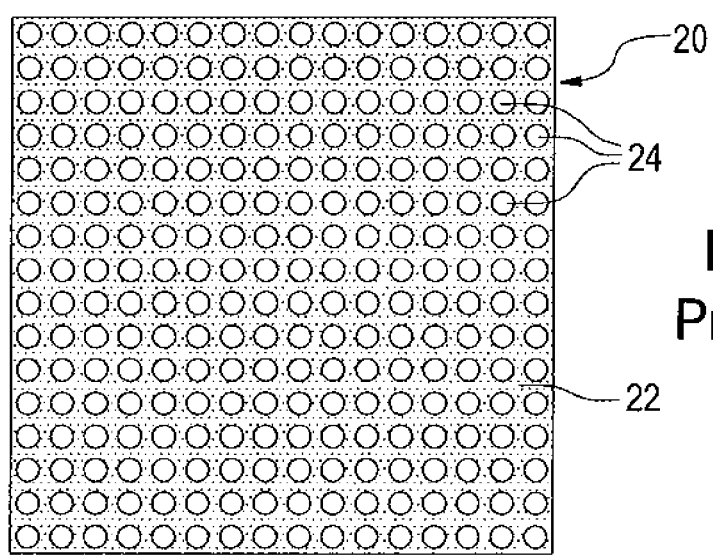
FIG. 2 shows a prior art example an object that is covered with reflective targets.
Figure 3A:
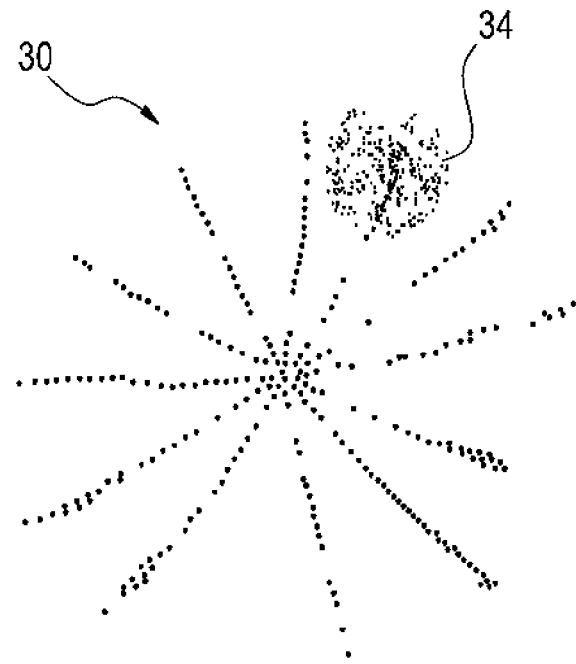
FIGS. 3A-3C show examples of computer generated three dimensional depictions of the shape of an object.
Figure 3B:
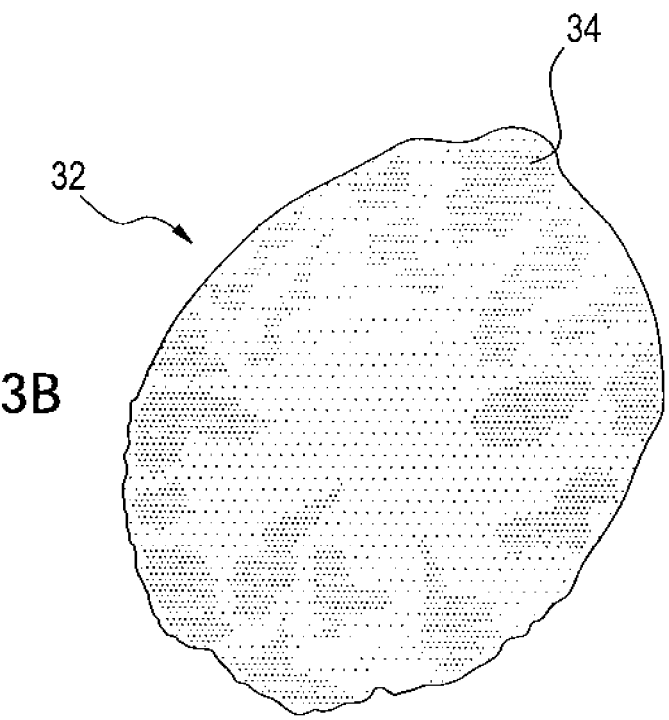
Figure 3C:
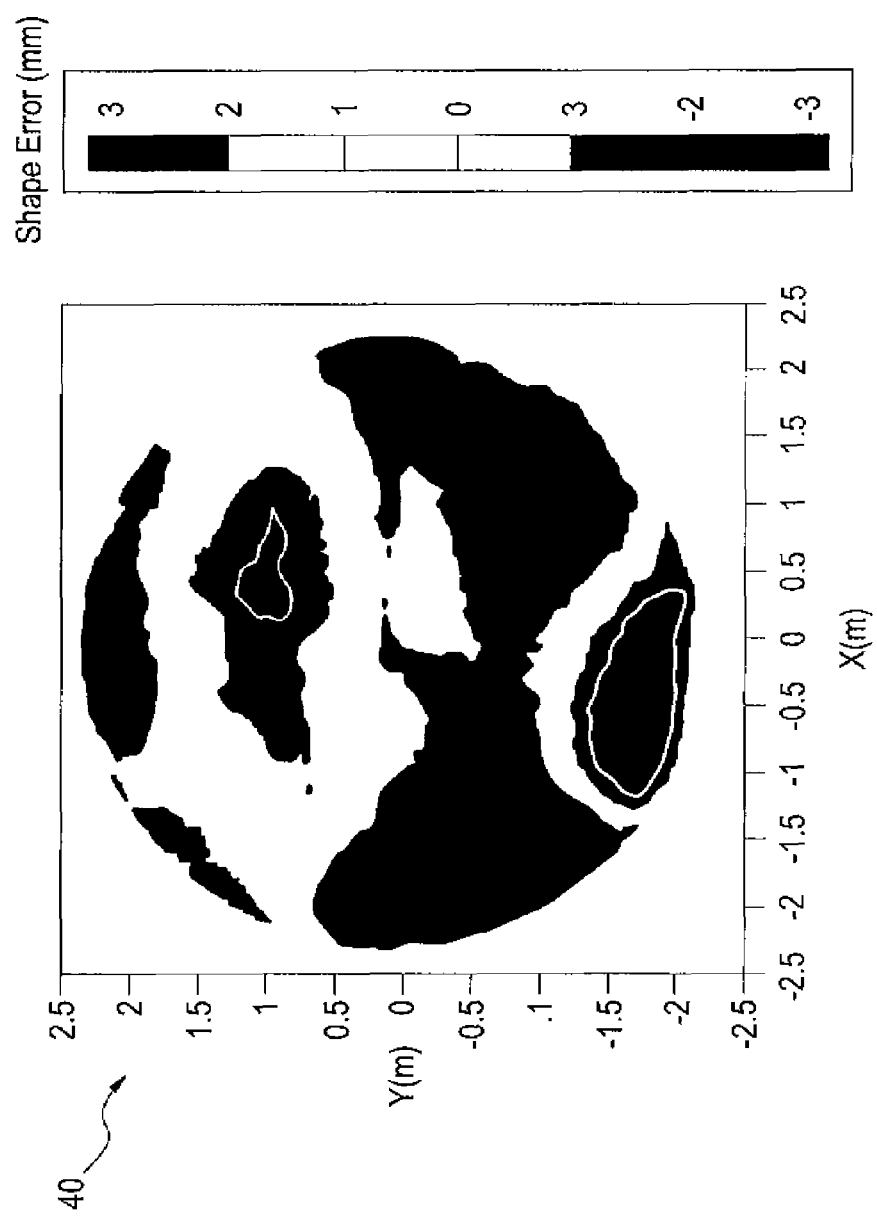

FIG. 4 shows a cross-sectional view of non-intrusive reflectors in accordance with one embodiment of the present invention. In this view 50 (not drawn to scale), the base membrane 52 of the antenna is sprayed with the nanofibers/solvent mixture. The nanofibers 54 form a diffuse surface in the shape of circular reflective targets similar to those shown previously in FIG. 2. In alternative embodiments, other suitable shapes could be used for the targets. A reflective coating 56 is applied over the membrane 52 and nanofibers 54. In this embodiment, the coating is made of a reflective metallized evaporative material. In other embodiments, the coating could be applied in alternative ways such as paint. Once the coating 56 is applied, the diffuse targets 54 are usually only visible when taking flash photographs at off-normal angles to the membrane. This assures that only light from the targets are reflected to the photogrammetry cameras. The targets are typically circular in shape as shown previously in FIG. 2. However, they may vary in size, shape and configuration as needed for proper photogrammetric use.

In some embodiments of the present invention, a masking template for the targets is used to overlay the membrane before the targets are applied with a spray jet device. This ensures a distinct contrast between the surface of the target and the membrane by preventing overspray that could blur the boundary between the two. In other embodiments of the present invention, the reflective metallized coating may be such materials as aluminum, gold, silver, chromium, germanium, or any other suitable reflective material. The reflective coating is applied in a layer that is 200-1200 Angstroms thick. However in other embodiments, other types of metallized coating that are well known in the art could be used.

While the examples discussed have dealt with thin film antennas that are designed for use in orbit, other uses are-possible. Any thin film objects, such as solar sails, that require precision measurement of their shape may use the embodiments described. Also, non-thin film objects may use the embodiments of the present invention in order to permanently apply reflective targets. This allows photogrammetric analysis to be periodically performed without requiring the reapplication of targets to the object. This has the added advantage of having measurements from targets that are in exactly the same location over the life cycle of the object.

In an alternative embodiment of the present invention, the diffuse targets are formed on separate film from the membrane. The targets are then punched from this film and applied to the membrane of the object with an adhesive. In another embodiment of the present invention, diffuse targets may be formed on the reflective coating with localized chemical etching known as "PAN etching". In this technique, the reflective coating of the membrane is masked to cover all target areas from exposure to an acid solution. An acid solution typically including water, phosphoric acid, acetic acid, and nitric acid is then applied to the coating. The exposed material will then be dissolved away from the underlying film. The film is then rinsed and the mask is removed to reveal a target formed of reflective material. In other embodiments, a laser could be used to etch the targets on the surface of film. In still other embodiments, the targets may be formed by mechanical abrasion, such as sand blasting, that is applied to the target area.

Another alternative method involves sprinkling the diffuse material in the membrane during its formation. The material is concentrated locally at the desired target positions without contaminating the surrounding membrane. Still another embodiment involves using diffuse targets that are made of a luminous material so that the targets are self-illuminating. These alternative embodiments both maintain the integrity of the homogenous membrane while minimizing distortion and deformation of the membrane.

Figure 5:
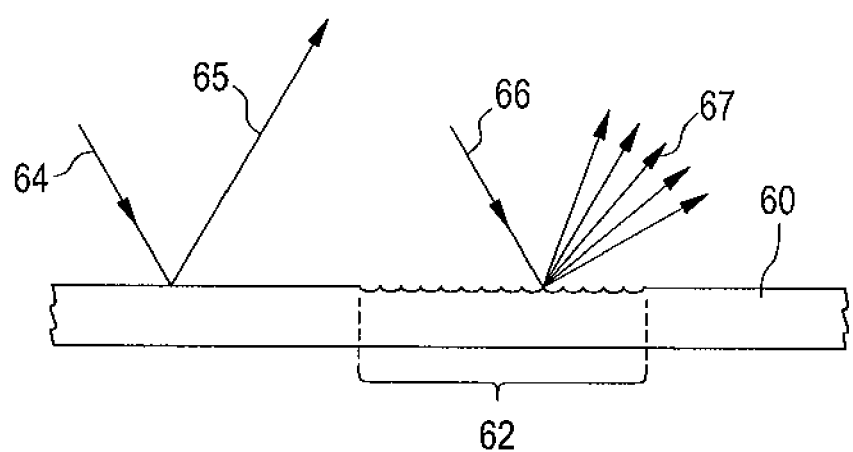
FIG. 5 shows a cross-sectional view of casting substrate with a diffuse surface section in accordance with one embodiment of the present invention.
Figure 6A:
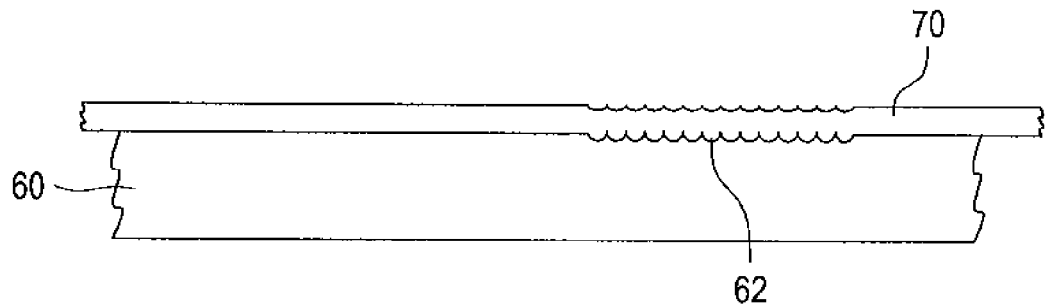
FIGS. 6A-6C show the progressive steps of forming a membrane with a casting substrate with a diffuse surface section in accordance with one embodiment of the present invention.
Figure 6B:
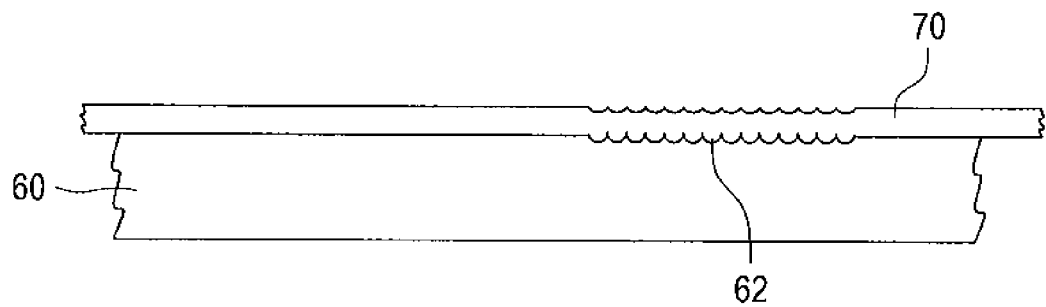
Figure 6C:
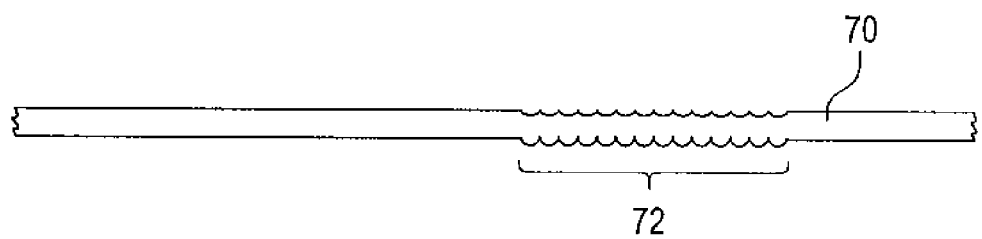

In another embodiment of the present invention, the membrane is formed on a casting surface or "substrate" with diffuse sections on its surface. FIG. 5 shows an example of such a substrate 60. The substrate 60 has a diffuse section 62 form in its surface. As described previously, the diffuse section 62 reflects light 66 in multiple directions 67 called "diffuse reflection". In contrast, the normal surface which reflects light 64 and only one angle 65 called "specular reflection". FIGS. 6A-6C show the steps of forming a membrane 70 with a substrate 60 having a diffuse section 62. In the first step, shown in FIG. 6A, a liquid film solution 70 of the material used to make the membrane is applied to the surface of the substrate 60 including the diffuse section 62. Next, the solution 70 and substrate 60 are cured to form the membrane as shown in FIG. 6B. Finally, the membrane 70 is released from the substrate 60 as shown in FIG. 6C. A diffuse area 72 is formed on the membrane as the underlying contours of the diffuse area 62 of the substrate are transferred during the curing step. The diffuse area 62 of the membrane 70 will become a suitable target when a reflective coating is applied.

While all of the embodiments described are directed towards use in photogrammetric analysis, it is important to understand that the invention could be used with other similar types of analysis such as: radar analysis with return contrast; laser scanners; reflective laser dynamic range (LDR) imaging; coherent laser radar; etc. All of these types of analysis as well as other similar techniques may use the embodiments described. As such, the use of the term "photogrammetric analysis" should be understood to be defined as non-contact three dimensional measurement of an object in order to encompass all such techniques.

One advantage of the present invention includes forming a non-intrusive reflective target on a thin film object for photogrammetric analysis. The target does not distort or deform the object because it adds minimal additional mass. Consequently, the results of photogrammetric analysis of the object are more accurate.

Another advantage of the present invention is that the targets are permanently embedded in the object. This allows for re-testing and re-analysis of the object at a later time without requiring re-application of new targets. Such re-testing could occur during/after manufacture, after shipment, after deployment, and periodically during the operational life of the object.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A method for applying a target reflector to an object for photogrammetric analysis, comprising:
    mixing a diffuse material with a solvent, where the diffuse material has a sufficient index of refraction so that the diffuse material will reflect light from a light source across an array of angles;
    applying the diffuse material and the solvent to the surface of the object so that the diffuse material bonds with the surface of the object; and
    applying a reflective coating to the surface of the object over the diffuse material and solvent, where the diffuse material forms a target reflector underneath the reflective coating for photogrammetric analysis.

2. The method of claim 1, where the object comprises a thin film polymer membrane.

3. The method of claim 2, where the polymer membrane has a thickness between 1.0 and 25.0 microns.

4. The method of claim 2, where diffuse material comprises fibers of the same polymer as the membrane.

5. The method of claim 1, where the diffuse material comprises micro-beads.

6. The method of claim 5, where the micro-beads are made of glass.

7. The method of claim 1, where the diffuse material bonds with the surface of the object by melting.

8. The method of claim 1, where the diffuse material comprises a luminous material.

9. The method of claim 1, where the reflective coating is a reflective metallized coating.

10. The method of claim 9, where the reflective metallized coating is an evaporative material.

11. The method of claim 9, where the reflective metallized coating comprises aluminum.

12. The method of claim 9, where the reflective metallized coating comprises gold.

13. The method of claim 9, where the reflective metallized coating comprises silver.

14. The method of claim 9, where the reflective metallized coating comprises germanium.

15. The method of claim 9, where the reflective metallized coating comprises chromium.

16. The method of claim 9, where the reflective metallized coating has a thickness of between 200-1200 Angstroms.

17. The method of claim 1, where the diffuse material and the solvent are applied with a jet sprayer.

18. The method of claim 1, where the diffuse material and the solvent are applied through a template that is overlayed on the surface of the object.

19. A method for applying a target reflector to an object for photogrammetric analysis, comprising:
    step for applying a diffuse material with solvent to the surface of the object, where the diffuse material has a sufficient index of refraction so that the diffuse material will reflect light from a light source across an array of angles; and
    step for applying a reflective material over the surface of the object for photogrammetric analysis.

20. A method for applying a target reflector to an object for photogrammetric analysis, comprising:
    casting a diffuse material from a mixture of diffuse material with a solvent in a film, where the diffuse material has a sufficient index of refraction so that the diffuse material will reflect light from a light source across an array of angels;
    punching segments of the diffuse material from the film and onto to the surface of the object, where the segments of diffuse material are held in place with adhesive; and
    applying a layer of reflective metallized coating to the surface of the object, where the segments of diffuse material form target reflectors on the surface of the object for photogrammetric analysis.

21. A method for applying a target reflector to an object for photogrammetric analysis, comprising:
    applying, a liquid solution from a mixture of diffuse material with a solvent of membrane material to a substrate, where the substrate has at least one diffuse areas on its surface;
    curing the liquid solution of membrane material to form a membrane, where the diffuse area of the substrate form a diffuse area in the membrane, where the diffuse area in the membrane has a sufficient index of refraction so that the diffuse material will reflect light from a light source across an array of angles;
    removing the membrane from the substrate; and
    applying a reflective coating to the surface of the object, where the diffuse area of the membrane forms a target reflector for photogrammetric analysis.

22. A method for applying a target reflector to an object for photogrammetric analysis, comprising:
    step for forming a diffuse area on a membrane from a mixture of diffuse material with a solvent that casts the object, where the diffuse area in the membrane has a sufficient index of refraction so that the diffuse material will reflect light from a light source across an array of angles; and
    step for applying a reflective material over the membrane so that a target reflector is formed on the object for photogrammetric analysis.

* * * * *